United States Patent

Horiguchi

[11] Patent Number: 5,336,872
[45] Date of Patent: Aug. 9, 1994

[54] INFORMATION RECORDING/REPRODUCING APPARATUS FOR USE IN AN OPTICAL CARD

[75] Inventor: Toshio Horiguchi, Hachioji, Japan

[73] Assignee: Olympus Optical Co., Ltd., Tokyo, Japan

[21] Appl. No.: 879,898

[22] Filed: May 8, 1992

[30] Foreign Application Priority Data

May 10, 1991 [JP] Japan ............... 3-133286

[51] Int. Cl.$^5$ ............... G06K 7/10; G06K 7/14; G06K 7/00; H04N 5/76
[52] U.S. Cl. ............... 235/454; 235/435; 235/474; 369/59
[58] Field of Search ........ 235/454, 461, 474, 480–483, 235/435; 369/14, 44.1, 59

[56] References Cited

U.S. PATENT DOCUMENTS

| | | | |
|---|---|---|---|
| 4,705,939 | 11/1987 | Ulinski et al. | 235/474 |
| 4,734,565 | 3/1988 | Pierce et al. | 235/454 |
| 4,797,872 | 1/1989 | Rokutan | 369/59 |
| 5,010,534 | 4/1991 | Enari et al. | 235/454 |

FOREIGN PATENT DOCUMENTS

| | | |
|---|---|---|
| 0301537 | 2/1989 | European Pat. Off. . |
| 0383237 | 8/1990 | European Pat. Off. . |
| 63-25868 | 2/1988 | Japan . |
| 2282973 | 11/1990 | Japan . |

OTHER PUBLICATIONS

Patent Abstracts of Japan vol. 14, No. 529 (P-1133) Nov. 22, 1990 & JP-A-2 233 074 (Omron Tateisi Electron Co.) Sep. 5, 1990.
Patent Abstracts of Japan vol. 14, No. 4 (P-986) Jan. 9, 1990 & JP-A-1 256 069 (Olympus Optical Co., Ltd.) Oct. 12, 1989.

*Primary Examiner*—Donald Hajec
*Assistant Examiner*—T. N. Forbus, Jr.
*Attorney, Agent, or Firm*—Stevens, Davis, Miller & Mosher

[57] ABSTRACT

An optical information recording/reproducing apparatus for use in an optical card, in which a moving speed of the optical card is detected on the basis of an information signal read out from the optical card and in which the information signal is corrected with the aid of the thus detected moving speed. Therefore, the data recorded on the optical card can be read out in a stable manner even when the optical card is transferred with a variation of its moving speed; and such apparatus can be manufactured at a low cost.

20 Claims, 9 Drawing Sheets

FIG_1
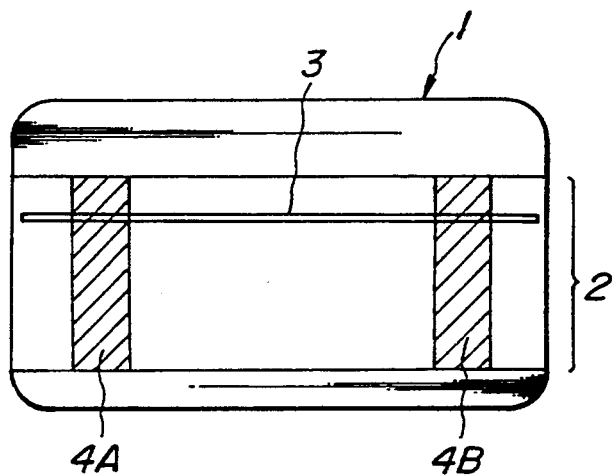
FIG_2
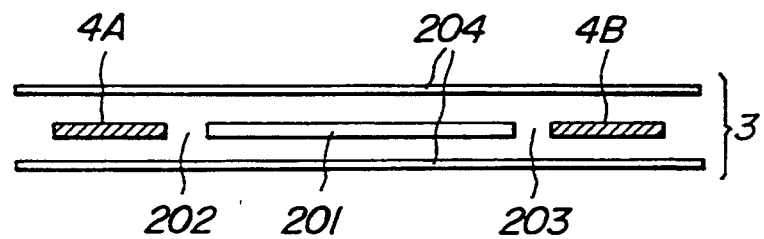

FIG_4

FIG_5

INFORMATION RECORDING/REPRODUCING APPARATUS FOR USE IN AN OPTICAL CARD

BACKGROUND OF THE INVENTION

1) Field of the Invention

The present invention relates to an information recording/reproducing apparatus for use in an optical card, in which the optical card is arranged to be moved in a reciprocal manner with respect to an optical head arranged in the apparatus. Particularly, the apparatus according to the invention is arranged such that information data can be read out in a stable manner even when the moving speed of the optical card is varied.

2) Related Art Statement

An optical card, which is not rewritable, has a large memory storage and is very convenient for carrying. Therefore, such an optical card is widely applied as a private health management card, a portable map, a bankbook, or a prepaid card for shopping.

Such an optical card has a construction as shown in FIG. 1. On the optical card, a plurality of data tracks are pre-recorded in a longitudinal direction of the optical card; and optical information is recorded/reproduced by relatively moving the optical card and the optical head in the track direction and in a direction perpendicular thereto. Optical information is modulated under a self-clock system modulation method, such as MFM modulation method, to be recorded on the optical card. When reproducing optical information recorded on the optical card, synchronous clock pulses are extracted from read out signals by a PLL method, and information data is reproduced based on the thus extracted synchronous clock pulses.

In Japanese Patent Laid-open Preliminary Publication No. 2-282973, an information recording/reproducing apparatus, which is arranged such that the optical card is held in a shuttle and the shuttle is driven with the aid of a VCM (voice coil motor), is disclosed.

Further, in Japanese Patent Laid-open Preliminary Publication No. 63-25868, another information recording/reproducing apparatus, in which a variation of moving speed of the shuttle holding an optical card therein is detected by using an encoder, and the read out signals are corrected by the thus detected variation of moving speed of the shuttle, is disclosed.

Generally, in an optical information recording/reproducing apparatus for an optical disc, a variation of rotation of the disc is very small because the optical disc per se has an inertia; and therefore, the variation of the rotation of the disc does not affect the synchronous clock pulses so much. However, in the optical information recording/reproducing apparatus for an optical card, it is necessary to move the optical card linearly with respect to the optical head in a reciprocal manner. Therefore, it is impossible to utilize the inertia to remove the variation of the moving speed of the optical card, so that the variation of the moving speed of the optical card becomes large.

In the apparatus disclosed in Japanese Patent Preliminary Publication No. 2-282973, the voice coil motor is used to drive the shuttle holding the optical card therein in order to restrain the variation of the moving speed of the optical card. By the voice coil motor it is possible to drive the shuttle without a driving mechanism such as a gear, and the voice coil motor has an excellent controllability. Therefore, the variation can be restrained to be extremely small. Further, in the apparatus disclosed in Japanese Patent Preliminary Publication No. 63-25868, the read out signal is corrected on the basis of a signal detected by the encoder, which is arranged on the shuttle, in order to absorb the variation of moving speed of the optical card.

However, when relatively driving the optical card with respect to the optical head in a reciprocal manner, the optical card should be stopped at both end portions of its moving area. Further, a distance from both the end portions to the information recording/reproducing area, within which the moving speed of the optical card should be increased up to a normal speed, is very short, i.e. about 5 mm. Therefore, in case of controlling the movement of the shuttle by using the voice coil motor, it is required that the voice coil motor have a large thrust. As a result, the cost for manufacturing the apparatus becomes expensive, the size of apparatus becomes large, and the weight becomes heavy.

On the other hand, in case of detecting the moving speed of the shuttle by using an encoder, the cost for manufacturing becomes expensive too, because of the price of the encoder. Further, when correcting the read out signal on the basis of the signal detected by the encoder, an encoder having a fine pitch is required, because it is necessary to detect the moving speed of the shuttle with a high accuracy. Therefore, the cost therefor becomes high. If an encoder having a rough pitch is used, such encoder could not follow any sudden change of the moving speed of the shuttle, so that information data could not be read out correctly.

SUMMARY OF THE INVENTION

The present invention has for its object to provide an optical information recording/reproducing apparatus for use in an optical card, by which optical information can be recorded/reproduced correctly even if the relative moving speed of the optical card with respect to the optical head is suddenly varied, but the apparatus can be manufactured at a low cost.

In order to carry out this object, the apparatus according to the present invention comprises:

an optical information recording/reproducing apparatus for use in an optical card, comprising:

an optical head for detecting information signal from an optical card;

a transfer means for reciprocally transferring said optical card in a track direction with respect to said optical head;

a demodulating means for demodulating said information signal detected by the optical head;

a controlling means for controlling the optical head, the demodulating means and the transfer means, a detection means for detecting a transferring speed of the optical card from said information signal detected by the optical head; and a correction means for correcting said information signal detected by the optical head in accordance with the transferring speed detected by said detection means.

As stated in the above, in the apparatus according to the present invention, the moving speed of the optical card is detected with the aid of an information signal read out from the optical card to derive a moving speed signal of an optical card, and the information signal read out from the optical card is corrected by the moving speed signal of the optical card. Therefore, in the apparatus according to the invention, even when the moving speed of the optical card varies largely, information data can be read out from the optical card in a correct manner. This is so because the moving speed signal is derived from the information signal, which is also varied corresponding to the variation of the moving speed of the optical card, and the information signal read out from the optical card is corrected with the aid of the thus derived moving speed signal.

BRIEF DESCRIPTION OF THE DRAWINGS

FIG. 1 is a schematic view showing a construction of an optical card used in the apparatus according to the invention;

FIG. 2 is a large-scaled schematic view depicting a construction of one of the tracks formed on the optical card;

DETAILED DESCRIPTION OF THE PREFERRED EMBODIMENTS

Figure 3:
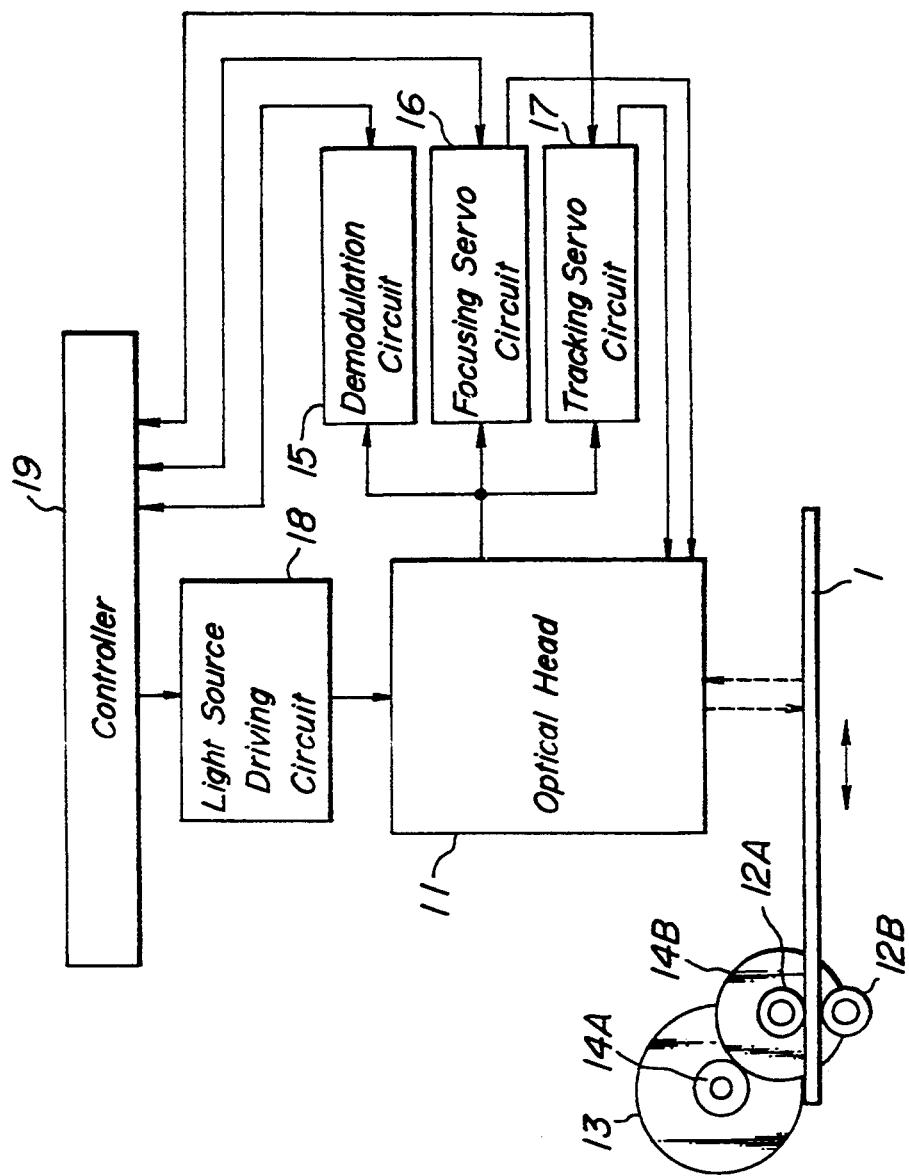
FIG. 3 is a block diagram indicating a whole construction of an apparatus according to the present invention.

FIG. 1 shows a construction of an optical card which is used in the apparatus according to the present invention. On the optical card 1 is provided an optical recording area 2 in which a plurality of data tracks 3 are formed. At both end portions of the recording area 2 are provided ID portions 4A and 4B on which track information corresponding to each track is preliminarily recorded. Between these ID portions 4A and 4B is arranged a data portion 5 which is preliminarily recorded when manufacturing the optical card 1.

FIG. 2 is an enlarged schematic view showing a construction of one of the tracks formed on the optical card 1. It should be noted that only one sector is formed in one track in this embodiment. In FIG. 2, the numerical reference 201 represents a sector data recorded in the data track 3, 202 a gap formed between the ID portion 4A and the sector data 201; 203 a gap formed between the ID portion 4B and the sector data 201; and 204 represents guide tracks by which tracking servo control is performed. The gaps 202 and 203 are provided in order to absorb a variation of moving speed of the optical card, which is generated when the optical card 1 is moved at a constant speed.

FIG. 3 illustrates a whole construction of an optical information recording/reproducing apparatus according to the invention, in which information data is recorded/reproduced on/from the optical card 1 having such a construction as shown in FIGS. 1 and 2. In the apparatus, optical information is recorded/reproduced by relatively moving the optical card 1 and an optical head 11. The optical card 1 is moved in a track direction along which the tracks 3 are extended, and the optical head 11 is moved in a direction which is perpendicular to the track direction. The optical card 1 is directly driven with the aid of rubber rollers 12A and 12B; and a driving source therefor is a motor 13. The rotating speed of the motor 13 is decelerated by gears 14A and 14B; then the rubber rollers 12A, whose shaft is commonly used in the gear 14B, directly drives the optical card 1. The rubber roller 12B serves as a following roller. In such driving system for driving the optical card, since the weight of the object to be driven, i.e. optical card, is very light, an inexpensive driving motor, such as DC motor, can be used.

The optical head 11 comprises a light source, an optical system including an objective lens and a photo detector; a light beam emitted from the light source is made incident upon the optical card 1 as a light beam spot via the optical system; the reflected light beam reflected by the optical card 1 is detected by the photo detector to be converted into electric signals, such as an information reproducing signal, a focus error signal and a track error signal. The information reproducing signal is sent to a demodulating circuit 15, and the focus error signal and the track error signal are supplied to a focusing servo circuit 16 and a tracking servo circuit 17, respectively. In the focusing servo circuit 16, a signal is produced for driving and controlling a focusing actuator (not shown), by which the light beam spot is controlled to be constantly formed on the optical card 1 in a focused condition. The tracking servo circuit 17 generates a signal for driving a tracking actuator (not shown) in accordance with the tracking error signal, by which the light beam spot is controlled to follow the track 3 formed on the optical card 1. Further, a light source driving circuit 18 serves to control a level of the light beam emitted from the light source in accordance with a command supplied from a controller 19, so that either a light beam having a high power for writing information or a light beam having a low power for reproducing information is illuminated on the optical card 1 as occasion demands.

Figure 4:
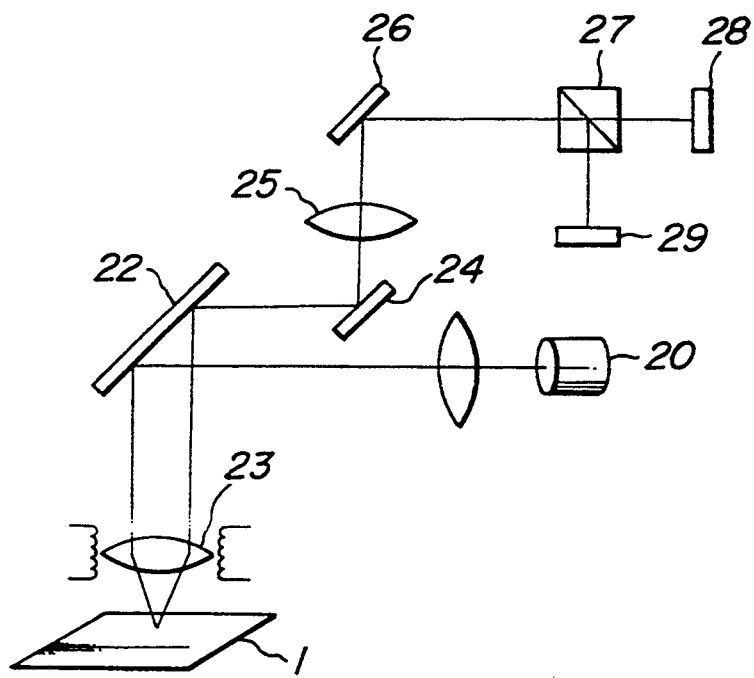
FIG. 4 is a schematic view illustrating an optical system arranged in an optical head of the apparatus according to the present invention.

FIG. 4 is a schematic view representing a construction of the optical system arranged in the optical head 11. By the optical system, a large area of the optical card 1 is illuminated by the light beam to read out information data recorded on the optical card 1. The light beam emitted from an LED 20 is made incident upon a mirror 22 via a collimator lens 21 and reflected thereon toward an objective lens 23. The light beam is condensed by the objective lens 23 and then made incident upon the optical card 1. The reflected light beam reflected by the optical card 1 is condensed by the objective lens 23 again, reflected by the mirrors 22 and 24, and further reflected by a mirror 26 via an image lens 25; and then the reflected light beam is made incident upon a beam splitter 27. The reflected light beam is divided into two light beams by the beam splitter 27, one of which is made incident upon a photo detector 28 for detecting a tracking error signal and information data signal, and the other one upon a photo detector 29 for detecting a focusing error signal.

In the optical system illustrated in FIG. 4, since the focus servo control is performed by an off-axial method, the photo detector 29 comprises two light receiving elements, and the difference between the outputs of these light receiving elements is detected in order to obtain the focusing error signal.

Figure 5:
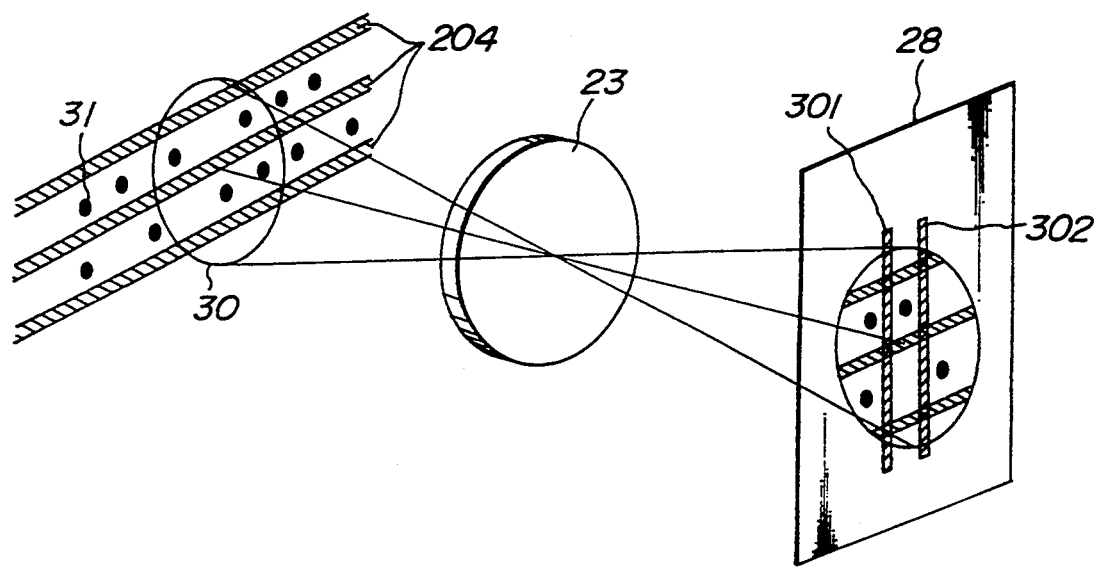
FIG. 5 is a schematic view representing a principle for reading out information data recorded on an optical card in a first embodiment of the invention.

FIG. 5 is a schematic view showing a principle for reading out information data recorded on the optical card 1. As shown in FIG. 5, on the photo detector 28, are provided line sensors 301 and 302; and images of the guide tracks 204 are formed so as to be perpendicular to the line sensors 301 and 302. In this system, the tracking error signal is obtained by detecting positions of the guide tracks 204 on the line sensors 301 and 302. Further, on the line sensors 301 and 302, images of recording pits 31 formed on the optical card 1 are also imaged. Therefore, by detecting an output of some portion of the line sensors 301 and 302, which corresponds to the image of the recording pit 31, an information data signal can be obtained. It may be possible to use not only line sensors, in which signals detected in each light receiving elements can be obtained independently, but also line sensors having a CCD, in which signals detected in each light receiving element are transferred to the demodulating circuit at the same time.

How to detect a moving speed of the optical card 1 from the reading signals obtained by the line sensors 301 and 302 and then to reproduce information recorded on the optical card 1 will be explained in the following, referring to FIGS. 6, 7 and 8. In this embodiment, since the optical card 1 is arranged to be reciprocally transferred with the aid of rubber rollers, the moving speed of the optical card 1 has some variation. Therefore, it is necessary to detect the moving speed of the optical card 1 and to correct the read out signal on the basis of the thus detected moving speed. In FIG. 5, a plurality of tracks are illuminated by the light beam in order to reproduce information recorded on the tracks simultaneously, but in FIG. 6, attention is paid to reproduce information recorded on only one track.

Figure 6:
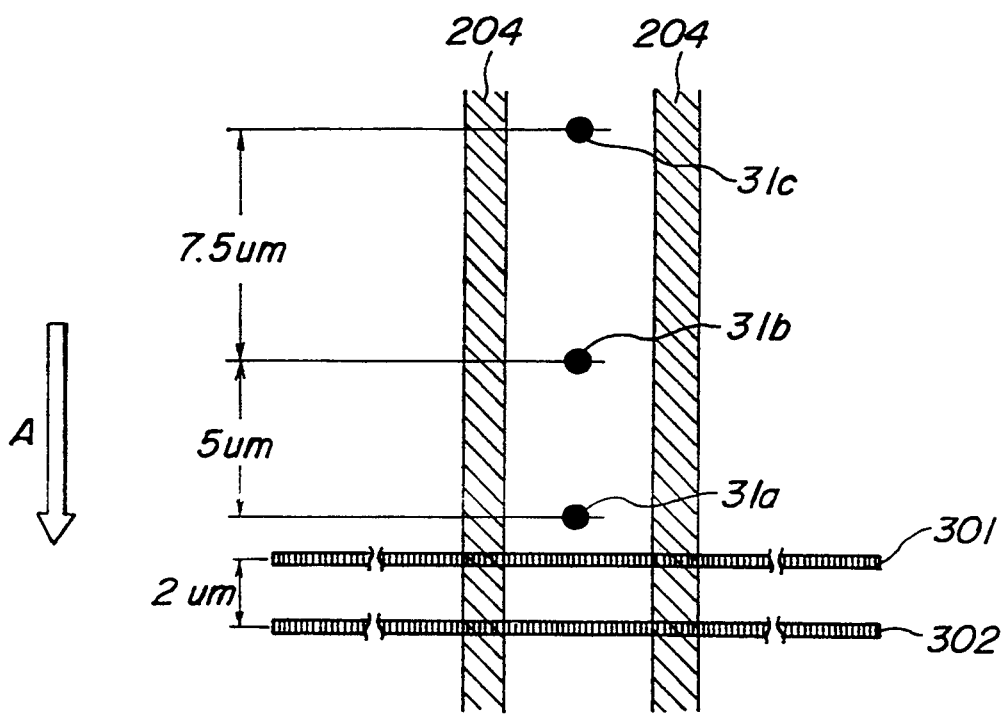
FIG. 6 is a schematic view showing an arrangement of first and second line sensors, images of guide tracks and images of data pits on a photo detector.
Figure 7:
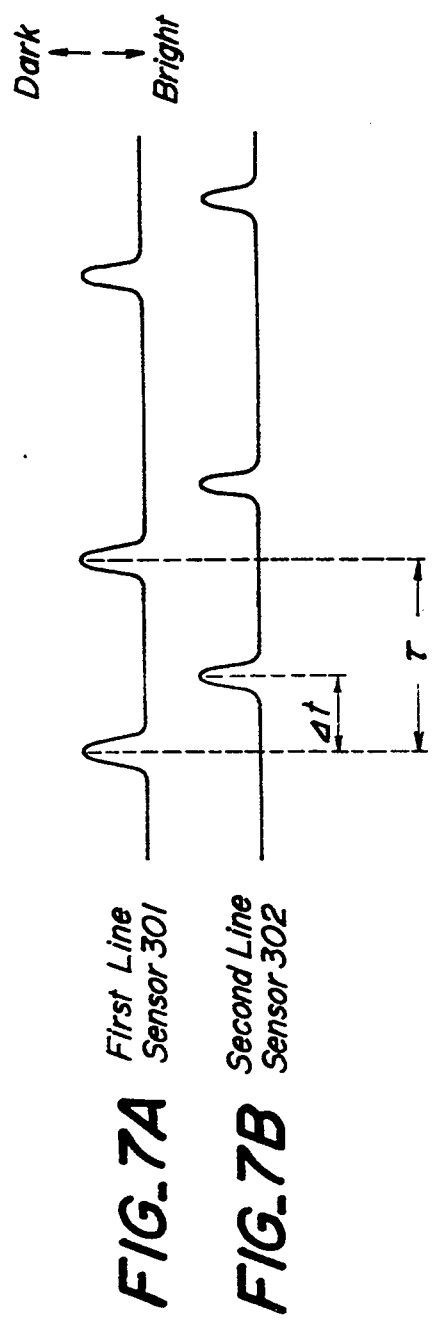
FIGS. 7A and B are schematic views depicting waveforms of outputs of the two line sensors.

In FIG. 6, there are indicated two guide tracks 204, images of recording pits 31a, 31b, 31c and first and second line sensors 301 and 302. The line sensors 301 and 302 are arranged on the photodetector 28 at a distance of 2 $\mu$m, which is scaled on the optical card 1. In the case that the optical system is so designed as to form the image of the recording pits and the guide tracks with the magnification of 10~20 times, the distance between the first and second line sensors 301 and 302 becomes 20~40 $\mu$m on the photo detector 28. Assuming that the recording pits are modulated by an MFM modulation method with a minimum pit distance of 5 $\mu$m, there exist three kinds of pit distances of 5 $\mu$m (1$\tau$), 7.5 $\mu$m (1.5$\tau$) and 10 $\mu$m (2$\tau$) on the optical card 1. In FIG. 6, it is arranged such that the distance between the recording pits 31a and 31b is 5 $\mu$m (1$\tau$) and the distance between the recording pit 31b and 31c is 10 $\mu$m (1.5$\tau$); and the optical card 1 is moved in a direction shown by an arrow A.

First, the recording pit 31a traverses the line sensor 301 in accordance with the movement of the optical card 1. Then an output of the first line sensor 301 corresponding to the recording pit 31a, i.e. read out signal, becomes dark. After the recording pit 31a has passed over the line sensor 301, the read out signal from the first line sensor 301 becomes bright. Next, the optical card proceeds in the direction A and the recording pit 31a traverses the line sensor 302, and then the read out signal from the second line sensor 302 becomes dark in the same manner. At this time, the next reading pit 31b has not reached to the first line sensor 301 yet, so the read out signal from the first line sensor 301 is still bright. FIG. 7A is a waveform showing the read out signal obtained from the first line sensor 301 when the recording pits 31a, 31b and 31c traverse the first line sensor in this order; and FIG. 7B is a waveform of the outputs of the second line sensor 302.

In FIGS. 7A and 7B, the horizontal axes represent time and the vertical axes show signal levels of the outputs of the line sensors; and the signal level is represented in such a manner that an upper side is dark and a lower side is bright. The pulses of these waveforms correspond to the recording pits 31a, 31b, 31c, respectively, in order starting from the left side. The reference $\Delta t$ represents a transit time taken for one recording pit to pass over the first and second line sensors 301 and 302, and the reference $\tau$ represents a pit distance on the first line sensor 301. It should be noted that the unit of the pit distance (reference $\tau$) is time.

Figure 8:
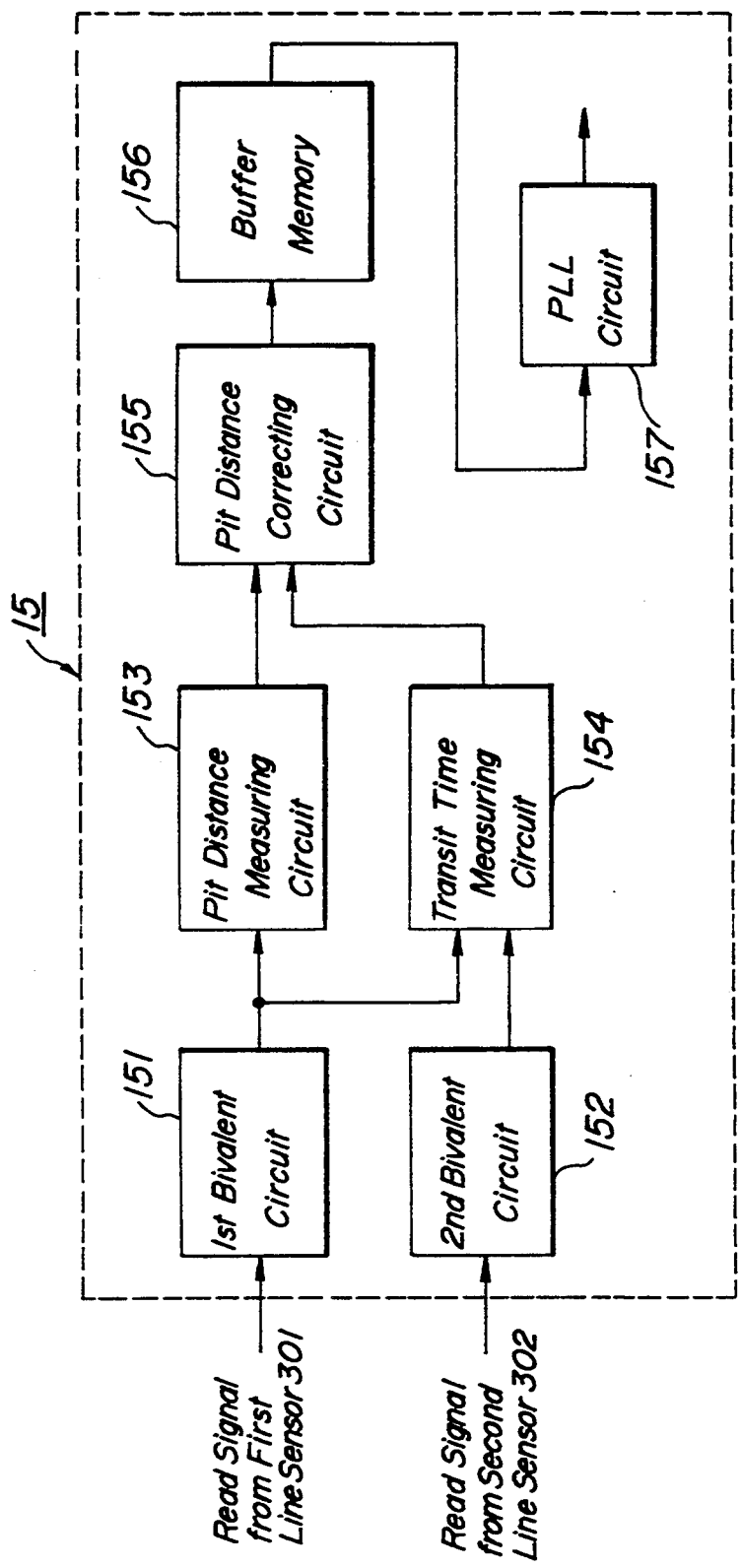
FIG. 8 is a block diagram indicating the first embodiment of the demodulating circuit of the apparatus.

FIG. 8 is a block diagram showing an example of the construction of the demodulation circuit 15. In the demodulation circuit 15, a variation of the moving speed of the optical card 1 is corrected in accordance with read out signals obtained from the first and second line sensors 301 and 302. That is to say, the read out signals obtained from the first and second line sensors 301 and 302 are converted into bivalent signals in first and second bivalent circuits 151 and 152, respectively. The output of the first bivalent circuit 151 is supplied to a pit distance measuring circuit 153, where the pit distance $\tau$ between the one recording pit and the next recording pit is measured. Further, the output of the first bivalent circuit 151 is supplied to a transit time measuring circuit 154, as well as the output of the second bivalent circuit 152. In the circuit 154, a transit time $\tau t$ in which one reading pit passes over the first and second line sensors 301 and 302 is measured. In the pit distance measuring circuit 152 and the transit time measuring circuit 153, there are provided counters, respectively, and these counters start to count clock pulses of a given period at a leading edge (or a trailing edge) of the first pulse and stop to count at a leading edge (or a trailing edge) of the second pulse, in order to measure the pit distance $\tau$ and the transit time $\Delta t$ with a unit of time.

Both of the outputs of the pit distance measuring circuit 153 and the transit time measuring circuit 154 are supplied to a pit distance correcting circuit 155, in which the pit distance $\tau$ is corrected with the aid of the value of $\Delta t$, in accordance with the following formula:

$$T = \tau \times t / \Delta t$$

where T represents a corrected pit distance (time), t represents a transit time (constant value) taken for one recording pit to pass over the first and second line sensors 301 and 302 when the optical card 1 is transferred without variation of its moving speed.

For instance, when the moving speed of the optical card 1 is 160 mm/sec when the optical card 1 is transferred without variation of its moving speed, the value t becomes 12.5 $\mu$sec. (2 $\mu$m/160 mm/sec. = 12.5 $\mu$sec.). Now, the pit distance $\tau$ measured by the pit distance measuring circuit 153 is 28 $\mu$sec, the transit time $\Delta \tau$ measured by the transit time measuring circuit 154 is 11 $\mu$sec, the corrected pit distance T becomes as follows.

$$T = 28 \times 12.5/11 = 31.81 \ \mu sec.$$

Therefore, it is proved that the pit distance τ measured in the circuit 153 is near the pit distance off 1τ, because the 1τ corresponds to 31.25 μsec when the optical card 1 is transferred with no variation of its moving speed. It is apparent that in case a different value of the pit distance is detected and the variation of the moving speed is different from the above value, the correction of the pit distance can be performed.

Since the output of the pit distance correcting circuit 155 is represented by a digital data showing the pit distance of the reading signals whose pit distance has been corrected, the output should be stored in a buffer memory 156 once, and then a pulse signal should be produced by reading out information from the buffer memory 156. The pulse signal is then supplied to a PLL circuit 157 in order to remove a jitter component which is generated when the read out signal is converted into the bivalent signals in the bivalent circuits 151 and 152 or generated by the correction error of the transferring speed of the optical card, and then a data demodulated signal is obtained. It should be noted that either an analog-system PLL circuit comprising a phase comparator, charge pump and VFO or a digital-type PLL circuit in which the corrected pit distance data is processed in a digital manner may be used.

Figure 9:
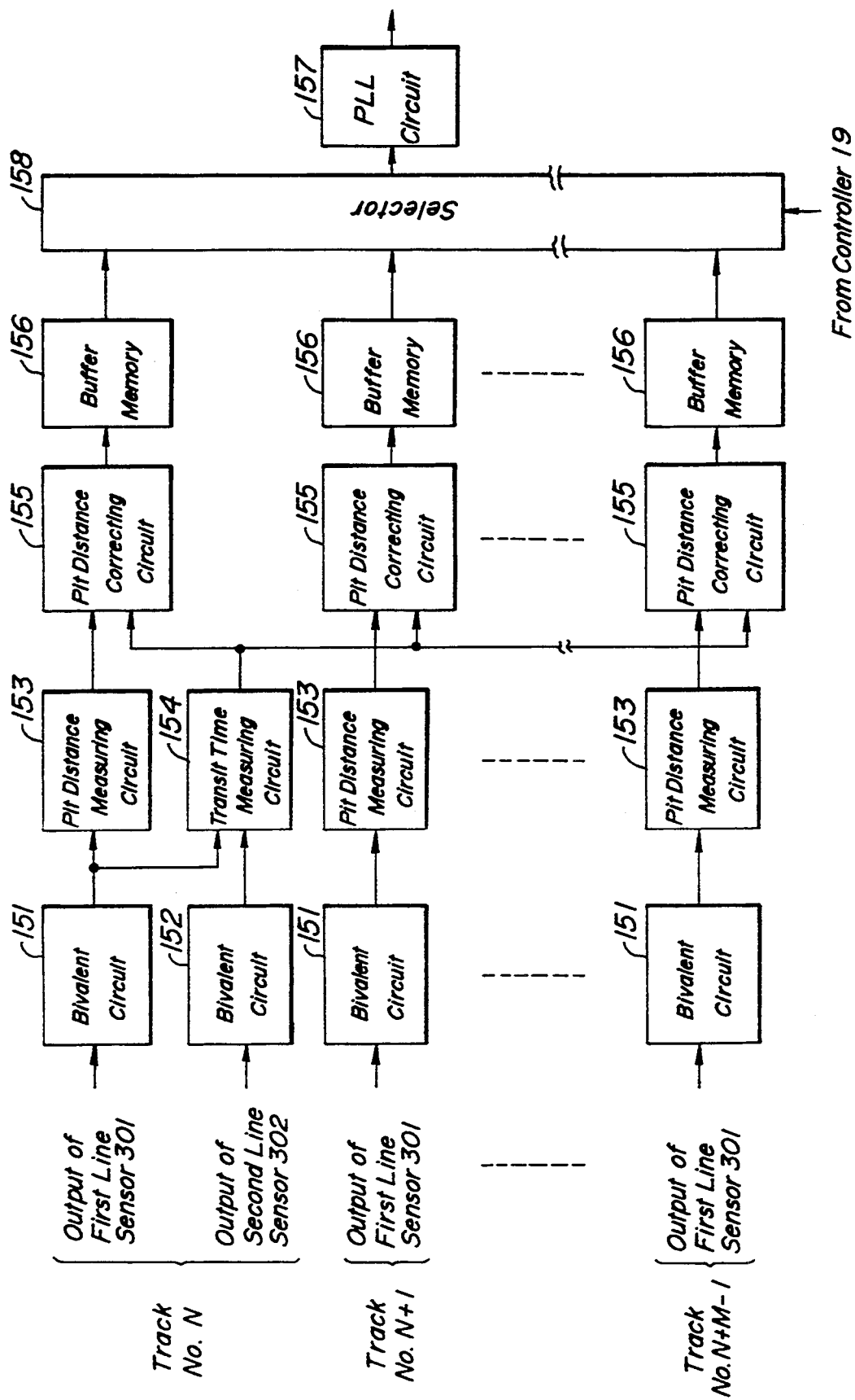
FIG. 9 is a block diagram illustrating a modification of the first embodiment of the demodulating circuit by which information data recorded on a plurality of data tracks can be read out simultaneously.

In the embodiment mentioned in the above, the attention is paid for that information data recorded on only one track of the optical card is read out, but it may be possible to arrange such that the demodulating circuit 15 detects the images of record pits formed on a plurality of tracks. In this case, information data recorded on a plurality of tracks of the optical card can be read out at the same time. FIG. 9 is a block diagram showing the construction of such demodulating circuit 15. It should be noted that the same numerical references are given to the same elements shown in FIG. 8.

As shown in FIG. 9, the pit distance measuring circuit 153, the pit distance correcting circuit 156 and the buffer memory 156 are arranged in each demodulating system for each track, but the transit time measuring circuit 154, arranged in the demodulating system for the track No. N, is commonly used in the other demodulating systems.

When information data recorded on the tracks from No. N to No. N+M−1 is read out at the same time, the pit distances measured by the pit distance measuring circuits 153 for the tracks from No. N to No. N+M−1 are corrected in the pit distance correcting circuits 155, respectively, with the aid of the transit time measuring circuit 154, which is arranged in the demodulating system for the track No. N; and the corrected pit distances are stored in the buffer memories 156 arranged in each demodulating system for each track. One of the memories stored in the buffer memories 156 is selected in a selector 158 in accordance with a selection signal supplied from a controller 19; and the selected memory signal is supplied to the PLL circuit 157, by which a demodulated data signal is obtained. In this embodiment, there is arranged only one transit time measuring circuit 154, and the pit distance of each track is corrected with the aid of the output of this measuring circuit 154, but it may be possible to arrange a transit time measuring circuit for each track, and the pit distance is corrected with the aid of the output of the transit time measuring circuit, independently.

Figure 10:
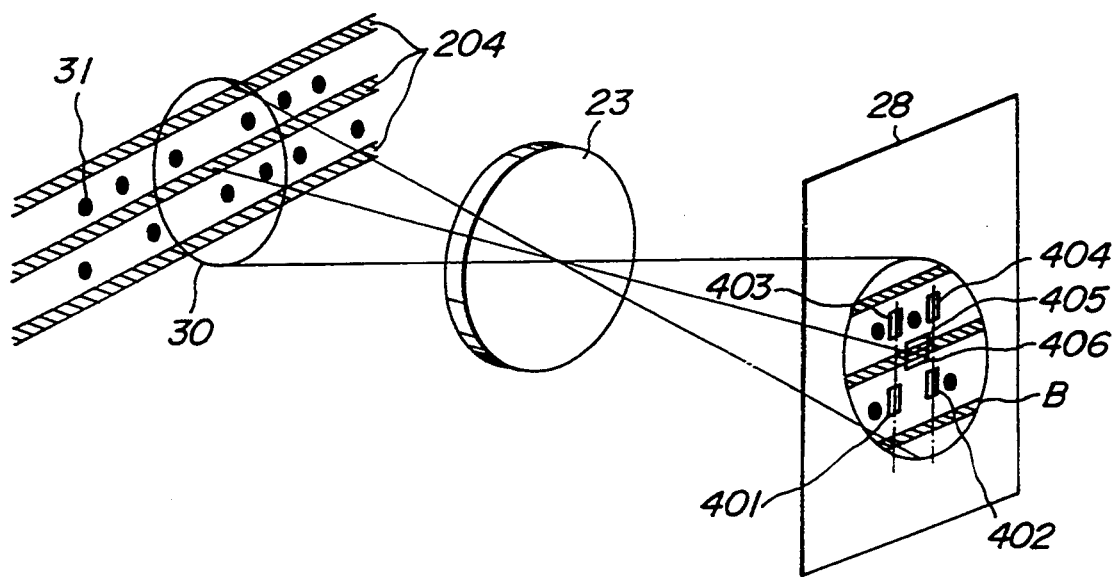
FIG. 10 is a schematic principle view showing a construction of the second embodiment of the apparatus according to the invention.

FIG. 10 is a schematic principle view illustrating the construction of the second embodiment of the apparatus according to the invention. It should be noted that the same numerical references in FIG. 5 are used for the same elements. In a circle B, images of guide tracks 204 and data pits 31 formed on the photo detector 28 via the lens system 23 are illustrated. The hatched portions represent the images of the guide tracks 204 and black circular shaped portions correspond to images of data pits. On the photo detector 28, are provided six light receiving elements 401 to 406. The elements 401 to 404 are for detecting the image of the data pits 31 and the elements 405 and 406 are for detecting a tracking error signal. The light receiving elements 401 and 403, and 402 and 404 are arranged on lines, which are perpendicular to the images of the guide tracks, respectively, to detect the existence of data pits and then to produce an electric signal. The light receiving elements 401 and 403, as well as 402 and 404, are arranged to be separated by 2 μm from each other when measured on the optical card 1. The light receiving elements 405 and 406 are arranged substantially in a center of the light receiving elements 401 to 404 so as to be separated from each other by a line extended in the parallel direction to the images of the guide tracks 204. The image of the guide track 204 is detected by the light receiving elements 405 and 406 to detect a tracking error signal. That is to say, a difference between the outputs of these light receiving elements 405 and 406 is detected as a tracking error signal; and a tracking servo system is effected on the basis of the thus detected tracking error signal.

As stated in the above, in the second embodiment, the light receiving elements 401 to 406 are used instead of the line sensors 301 and 302 of the first embodiment. The read out signal can be corrected in the same manner as explained in the first embodiment.

In the above mentioned embodiment, a light emitting diode LED is used as a light source, but another other element, such as laser diode, may be used. Further, it is arranged such that the optical card is directly transferred with the aid of a rubber roller, but it may be possible to arrange such that the optical card is contained in a shuttle and the shuttle is driven by the aid of a rotating motor and a belt or a wire.

As stated in the above in detail, in the apparatus according to the present invention, even when the optical card is transferred with a variation of its moving speed, information data can be read out from the optical card in a stable manner; additionally, the apparatus can be manufactured at a low cost.

I claim:

1. An optical information recording/reproducing apparatus for use in an optical recording medium, comprising:
   an optical head for detecting information signals from an optical recording medium;
   a transfer means for transferring said optical recording medium in a track direction with respect to said optical head;
   a demodulating means for demodulating said information signal detected by the optical head;
   a controlling means for controlling the optical head, the demodulating means and the transfer means;
   a detection means for detecting a transferring speed of the optical recording medium from said information signal detected by the optical head; and
   a correction means for correcting said information signal detected by the optical head in accordance with the transferring speed of the optical recording medium detected by said detection means.

2. An apparatus according to claim 1, wherein:

said optical head comprises a photo detector on which images of data tracks and data pits formed on the data tracks are formed;

said photo detector comprises at least first and second sensors for detecting said images of data pits; a pit distance between data pits successively arranged on the optical recording medium, and a transit time, taken for that one of the data pits passes over the first and second sensors, are detected in accordance with outputs of the first and second sensors.

3. An apparatus according to claim 2, wherein:

said demodulating means comprises a pit distance measuring circuit, to which a read signal of the data pit from said first sensor is supplied, for detecting a pit distance; a transit time measuring circuit, to which said read signal detected by said first sensor and a read signal detected by said second sensor are given, for measuring a transit time taken for one data pit to pass over the first and second sensors; and a pit distance correcting circuit for correcting an error of the pit distance measured by said pit distance measuring circuit in accordance with the transit time of data pit detected by the transit time measuring circuit.

4. An apparatus according to claim 3, wherein:

said demodulating circuit further comprises a first bivalent circuit for converting the read signal detected by the first sensor into bivalent signals and a second bivalent circuit for converting the read signal detected by the second sensor into bivalent signals; and a buffer memory for storing the output signal of said pit distance correcting circuit and producing a pulse signal corresponding to an output of said pit distance correcting circuit; and a PLL circuit for removing a jitter component included in said corrected read signals and obtaining a demodulated data signal.

5. An apparatus according to claim 4, wherein:

the pit distance measured in the pit distance measuring circuit is corrected in said pit distance correcting circuit by calculating the following formula:

$$T = \tau \times t/\Delta t$$

where,

T represents a corrected pit distance $\tau$ represents the measured pit distance t represents a time period taken for a data pit to pass over the first and second sensors when the optical recording medium is transferred without variation in its moving speed $\Delta t$ represents a time period taken for a data pit actually to pass over the first and second sensors.

6. An apparatus according to claim 3, wherein:

said demodulating means comprises a plurality of said pit distance measuring circuits for detecting pit distances of reading data pits formed on a plurality of data tracks, one said transit time measuring circuit, and a plurality of said pit distance correcting circuits;

to each of said plurality of pit distance measuring circuits is supplied each read signal for each data track detected by said first sensor in order to detect each pit distance; to said transit time measuring circuit one of the read signals supplied from said first sensor and each read signal for each data track detected by said second sensor is given in order to measure a transit time taken for one data pit to pass over the first and second sensors for each data track; and in the pit distance correcting circuits, an error of each pit distance measured by each pit distance measuring circuit is corrected in accordance with the transit time detected by the transit time measuring circuit.

7. An apparatus according to claim 6, wherein:

the pit distance measured in each pit distance measuring circuit is corrected in each pit distance correcting circuit by calculating the following formula, $$T = \tau \times t/\Delta t$$

where,

T represents a corrected pit distance $\tau$ represents the measured pit distance t represents a time taken for a data pit to pass over the first and second sensors when the optical recording medium is transferred without variation in its moving speed $\Delta t$ represents a time period required for a data pit to actually pass over the first and second sensors.

8. An apparatus according to claim 7, wherein:

said demodulating circuit further comprises a plurality of bivalent circuits for converting the read signals detected by the first and second sensors into bivalent signals;

a plurality of buffer memories for storing the outputs of said pit distance correcting circuits and producing pulse signals corresponding to an output of said pit distance correcting circuit;

a selector for selecting one of the pulse signals in accordance with a command supplied from said controlling means and outputting the thus selected pulse signals; and a PLL circuit for removing a jitter component included in said pulse signals selected in said selector and obtaining a demodulated data signal.

9. An apparatus according to claim 2, wherein: said sensors comprise line sensors.

10. An apparatus according to claim 3, wherein: said sensors comprise line sensors.

11. An apparatus according to claim 4, wherein: said sensors comprise line sensors.

12. An apparatus according to claim 5, wherein: said sensors comprise line sensors.

13. An apparatus according to claim 6, wherein: said sensors comprise line sensors.

14. An apparatus according to claim 7, wherein: said sensors comprise line sensors.

15. An apparatus according to claim 8, wherein: said sensors comprise line sensors.

16. An apparatus according to claim 1, wherein said optical recording medium is an optical card.

17. An apparatus according to claim 1, wherein said transfer means reciprocally transfers said optical recording medium in a track direction with respect to said optical head.

18. An apparatus according to claim 9, wherein said line sensors comprise CCD's.

19. An apparatus according to claim 2, wherein said photo detector further comprises third and fourth sensors for detecting said images of data pits and fifth and sixth sensors for detecting a tracking error; said first and second sensors detect said images of data pits on a first one of said data tracks while said third and fourth sensors detect said images of data pits on a second one of said data tracks; and a distance between said first and second sensors equals a distance between said third and fourth sensors.

20. An apparatus according to claim 19, wherein said first and third sensors are disposed on a first common line perpendicular to said track direction; said second and fourth sensors are disposed on a second common line perpendicular to said track direction; and said fifth and sixth sensors are disposed between said first and second common lines.

* * * * *